J. Ash.
DAMPER.

No. 119,911.  Patented Oct. 17, 1871.

Witnesses.
Cha. Kenyon
Villette Anderson

Inventor
James Ash,
Chipman Hosmer & Co
Attys.

UNITED STATES PATENT OFFICE.

JAMES ASH, OF STERLING, ILLINOIS.

IMPROVEMENT IN STOVE-PIPE DAMPERS.

Specification forming part of Letters Patent No. 119,911, dated October 17, 1871; antedated September 30, 1871.

*To all whom it may concern:*

Be it known that I, JAMES ASH, of Sterling, in the county of Whiteside and State of Illinois, have invented a new and valuable Improvement in Dampers; and I do hereby declare that the following is a full, clear, and exact description of the construction and operation of the same, reference being had to the annexed drawing making a part of this specification, and to the letters and figures of reference marked thereon.

Figure 1:
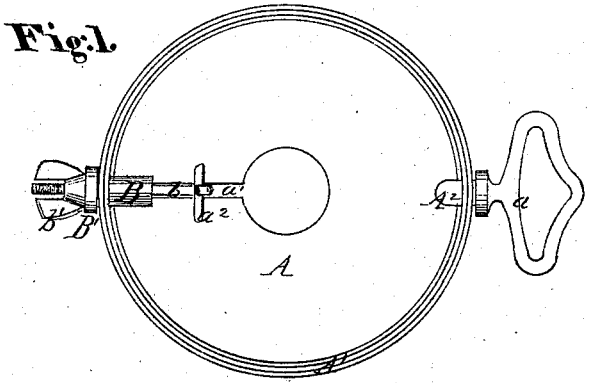
Figure 2:
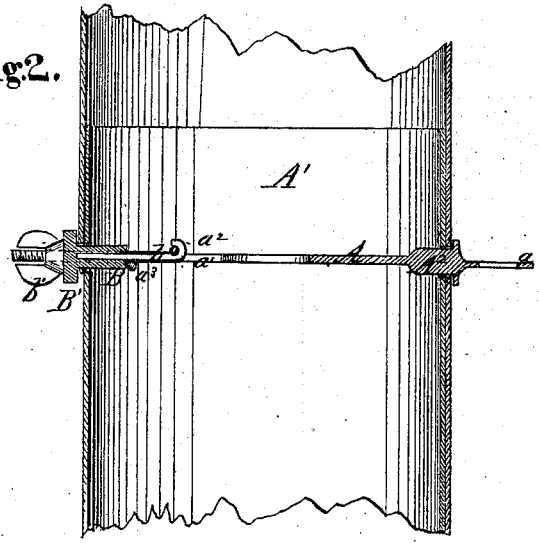
Figure 3:
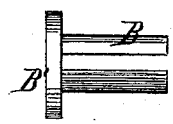

Figure 1 of the drawing is a top view of my improvement. Fig. 2 is a vertical section. Fig. 3 is a view of sliding washer detached.

This is an improvement in stove-pipe dampers, and relates to the application of a sliding washer to one of the spindles or journals of said damper so as to prevent the thumb-screw on the end of the journal from being loosened when the damper is turned; the object being to retain the damper in any desired position by friction.

In the drawing, A represents the damper journaled to revolve in the stove-pipe $A^1$. The journal $A^2$ passes through an opening in the pipe and is provided with a suitable handle, $a$. On the opposite side of the damper a radial slot, $a^1$, is cut, over which is a loop, $a^2$. To this loop a hooked rod, $b$, is attached, the same extending through an opening in the pipe. A screw-thread is formed on the outer end of said rod to hold a thumb-screw, $b'$. B represents the sliding washer or sleeve, having a rounded shank to turn in the pipe opening in which it is placed, the rod passing through it, and a head, $B'$, to rest against the outside of the pipe. This washer is slotted lengthwise so that it may rest firmly on the damper on either side of the slot $a^1$. A loop, $a^3$, on the under side of the slot $a^1$ prevents the rod $b$ from dropping.

What I claim as new, and desire to secure by Letters Patent, is—

The washer or sleeve B, rod $b$, and thumb-screw $b'$, when applied to a stove-pipe damper, as and for the purpose specified.

In testimony that I claim the above I have hereunto subscribed my name in the presence of two witnesses.

JAMES ASH.

Witnesses:
 E. HEMPSTEAD,
 J. B. MYERS.

(154)